United States Patent
Keramat Siavash et al.

(10) Patent No.: US 11,111,900 B2
(45) Date of Patent: Sep. 7, 2021

(54) WIND TURBINE AUGMENTED BY A DIFFUSER WITH A VARIABLE GEOMETRY

(71) Applicants: Nemat Keramat Siavash, Tehran (IR); Gholamhassan Najafi, Tehran (IR); Barat Ghobadian, Tehran (IR); Neda Mashhadgarme, Tehran (IR)

(72) Inventors: Nemat Keramat Siavash, Tehran (IR); Gholamhassan Najafi, Tehran (IR); Barat Ghobadian, Tehran (IR); Neda Mashhadgarme, Tehran (IR)

(73) Assignees: TARBIAT MODARES UNIVERSITY, Tehran (IR); Nemat Keramat Siavas, Tehran (IR); Gholamhassan Najafi, Tehran (IR)

( * ) Notice: Subject to any disclaimer, the term of this patent is extended or adjusted under 35 U.S.C. 154(b) by 0 days.

(21) Appl. No.: 16/920,528

(22) Filed: Jul. 3, 2020

(65) Prior Publication Data
US 2020/0362812 A1    Nov. 19, 2020

Related U.S. Application Data
(60) Provisional application No. 62/870,065, filed on Jul. 3, 2019.

(51) Int. Cl.
| | | |
|---|---|---|
| F03D 1/04 | (2006.01) | |
| F03D 7/02 | (2006.01) | |
| F03D 1/06 | (2006.01) | |

(52) U.S. Cl.
CPC ............. F03D 1/04 (2013.01); F03D 7/0204 (2013.01); F03D 1/0666 (2013.01);
(Continued)

(58) Field of Classification Search
CPC ........ F03D 1/04; F03D 1/0666; F03D 7/0204; F05B 2240/13; F05B 2240/133;
(Continued)

(56) References Cited

U.S. PATENT DOCUMENTS

| | | | | |
|---|---|---|---|---|
| 4,021,135 A | * | 5/1977 | Pedersen | F03D 1/04 |
| | | | | 415/208.2 |
| 4,075,500 A | * | 2/1978 | Oman | F03D 7/02 |
| | | | | 290/55 |

(Continued)

*Primary Examiner* — Pedro J Cuevas
(74) *Attorney, Agent, or Firm* — Bajwa IP Law Firm; Haris Zaheer Bajwa

(57) ABSTRACT

A diffuser-augmented wind turbine may include an annular diffuser that may encompass a rotor such that the rotor and the annular diffuser may be coaxial about a main axis. A diffuser-augmented wind turbine may further include a flared diffuser assembly that may be connected to the annular diffuser such that an air stream discharged from the annular diffuser may enter the flared diffuser assembly. A flared diffuser assembly may include a fixed flared diffuser that may include a number of flared petals extending from a leading edge of the fixed flared diffuser toward the trailing edge thereof. A flared diffuser assembly may further include a rotatable flared diffuser that may be disposed coaxially within the fixed flared diffuser and rotatable about the main axis. A rotatable flared diffuser may include a number of flared petals extending from an annular leading edge of the rotatable flared diffuser toward a trailing edge thereof.

13 Claims, 12 Drawing Sheets

(52) U.S. Cl.
CPC ..... *F05B 2240/13* (2013.01); *F05B 2240/133* (2013.01); *F05B 2240/33* (2013.01); *F05B 2250/232* (2013.01); *F05B 2270/32* (2013.01); *F05B 2270/602* (2013.01); *F05B 2270/802* (2013.01); *Y02E 10/72* (2013.01)

(58) Field of Classification Search
CPC ............ F05B 2240/33; F05B 2250/232; F05B 2270/32; F05B 2270/602; F05B 2270/802; Y02E 10/72
USPC ..................................................... 290/44, 55
See application file for complete search history.

(56) References Cited

U.S. PATENT DOCUMENTS

| | | | | |
|---|---|---|---|---|
| 4,132,499 A * | 1/1979 | Igra | ........................... | F15D 1/06 415/210.1 |
| 4,204,799 A * | 5/1980 | de Geus | .................... | F03D 1/04 415/4.5 |
| 4,324,985 A * | 4/1982 | Oman | ........................ | F03D 1/04 290/55 |
| 4,422,820 A * | 12/1983 | Kirsch | ...................... | F03D 1/04 415/4.3 |
| 4,482,290 A * | 11/1984 | Foreman | ................... | F03D 1/04 415/207 |
| 4,684,316 A * | 8/1987 | Karlsson | .................. | F03D 1/04 415/211.1 |
| 4,720,640 A * | 1/1988 | Anderson | ............... | F03D 13/20 290/43 |
| 5,599,172 A * | 2/1997 | McCabe | .................. | F03D 9/28 417/334 |
| 6,836,028 B2 * | 12/2004 | Northrup | .................. | H02P 9/04 290/44 |
| 6,887,031 B1 * | 5/2005 | Tocher | ...................... | F03D 1/04 415/1 |
| 7,018,166 B2 * | 3/2006 | Gaskell | ..................... | F03D 1/04 415/4.3 |
| 7,218,011 B2 * | 5/2007 | Hiel | ........................ | F03D 80/70 290/43 |
| 7,220,096 B2 * | 5/2007 | Tocher | ...................... | F03D 9/43 415/1 |
| 7,484,363 B2 * | 2/2009 | Reidy | ..................... | F03D 9/257 60/398 |
| 7,550,864 B2 * | 6/2009 | Anderson | ................ | F03D 9/22 290/55 |
| D608,736 S * | 1/2010 | Brock | .......................... | D13/115 |
| 7,874,788 B2 * | 1/2011 | Stothers | .................... | F03B 3/18 415/4.5 |
| 7,976,268 B2 * | 7/2011 | Presz, Jr. | .................. | F03D 1/04 415/4.3 |
| 7,976,269 B2 * | 7/2011 | Presz, Jr. | ................. | F03D 13/20 415/4.3 |
| 7,976,270 B2 * | 7/2011 | Presz, Jr. | .................. | F03D 1/04 415/4.3 |
| 7,980,811 B2 * | 7/2011 | Presz, Jr. | .................. | F03D 1/04 415/4.3 |
| 8,021,100 B2 * | 9/2011 | Presz, Jr. | .................. | F03D 1/04 415/4.3 |
| 8,072,091 B2 * | 12/2011 | Wilson | .................... | F03B 11/02 290/55 |
| 8,257,019 B2 * | 9/2012 | Cironi | ..................... | F03D 13/20 415/4.3 |
| 8,317,469 B2 * | 11/2012 | Kinzie | ...................... | F03D 1/04 415/211.2 |
| 8,376,686 B2 * | 2/2013 | Presz, Jr. | .................. | F03B 3/04 415/1 |
| 8,393,850 B2 * | 3/2013 | Werle | ........................ | F03D 1/04 415/7 |
| 8,461,713 B2 * | 6/2013 | Sammy | ................... | F03D 1/025 290/55 |
| 8,545,187 B2 * | 10/2013 | Presz, Jr. | .............. | F03D 7/0268 416/246 |
| 8,573,933 B2 * | 11/2013 | Presz, Jr. | ................. | F03D 13/20 415/182.1 |
| 8,587,144 B2 * | 11/2013 | Urch | ........................ | F03D 9/25 290/54 |
| 8,622,688 B2 * | 1/2014 | Presz, Jr. | ................. | F01D 25/24 415/4.3 |
| 8,657,572 B2 * | 2/2014 | Presz, Jr. | .................. | F03D 1/04 415/227 |
| 8,672,624 B2 * | 3/2014 | Brock | ....................... | F03D 1/04 415/220 |
| 8,714,923 B2 * | 5/2014 | Presz, Jr. | ................. | F01D 25/24 415/220 |
| 8,721,279 B2 * | 5/2014 | Brock | ....................... | F03D 1/04 415/220 |
| 8,794,903 B2 * | 8/2014 | Fedor | ..................... | F03D 13/20 415/4.3 |
| 8,814,493 B1 * | 8/2014 | Komp | ....................... | F03D 9/25 415/1 |
| 8,851,836 B2 * | 10/2014 | Brock | ....................... | F03D 1/04 415/220 |
| 9,000,604 B2 * | 4/2015 | Sireli | ..................... | F03B 17/061 290/54 |
| 9,194,362 B2 * | 11/2015 | Merlini, III | ............... | F03D 9/25 |
| 9,322,391 B2 * | 4/2016 | Brock | ....................... | F03D 1/04 |
| 9,512,817 B2 * | 12/2016 | Wood | ....................... | F03D 1/04 |
| 9,567,970 B2 * | 2/2017 | Wood | .................... | F03D 1/0625 |
| 9,926,906 B2 * | 3/2018 | Mansberger | .............. | F03D 9/25 |
| 9,932,959 B2 * | 4/2018 | Al-Shibl | .................. | F03D 1/04 |
| 10,294,913 B2 * | 5/2019 | Schurtenberger | ......... | F03B 3/04 |
| 10,563,635 B2 * | 2/2020 | Visser | ..................... | F03D 1/04 |
| 2005/0002783 A1 * | 1/2005 | Hiel | ........................ | F03D 80/70 415/208.1 |
| 2008/0258467 A1 * | 10/2008 | Wilson | .................... | F03B 11/02 290/54 |
| 2009/0180869 A1 * | 7/2009 | Brock | ..................... | F03D 13/20 415/208.2 |
| 2009/0280008 A1 * | 11/2009 | Brock | ...................... | F03D 1/04 415/208.2 |
| 2009/0280009 A1 * | 11/2009 | Brock | ...................... | F03D 1/04 415/208.2 |
| 2011/0148117 A1 * | 6/2011 | Bailey | ..................... | F03D 13/20 290/52 |
| 2012/0099977 A1 * | 4/2012 | Churchill | ................ | F03B 15/08 415/185 |
| 2012/0128475 A1 * | 5/2012 | Bailey | ...................... | F03D 1/04 415/182.1 |
| 2012/0175882 A1 * | 7/2012 | Sterling | .................... | F03D 1/04 290/55 |
| 2014/0044535 A1 * | 2/2014 | Wood | ...................... | F03D 1/025 415/207 |
| 2014/0227092 A1 * | 8/2014 | Wood | ....................... | F03D 1/04 415/207 |

\* cited by examiner

WIND TURBINE AUGMENTED BY A DIFFUSER WITH A VARIABLE GEOMETRY

CROSS-REFERENCE TO RELATED APPLICATION

This application claims the benefit of priority from pending U.S. Provisional Patent Application Ser. No. 62/870,065, filed on Jul. 3, 2019, and entitled "CONTROLABLE DUCT FOR SMALL WIND TURBINES," which is incorporated herein by reference in its entirety.

TECHNICAL FIELD

The present disclosure relates to wind turbines augmented by diffusers and particularly relates to a wind turbine augmented by a diffuser with a variable geometry. More particularly, the present disclosure relates to a system and method for controlling the amount of drag forces acting on a diffuser-augmented wind turbine.

BACKGROUND

A wind turbine converts the power of wind into mechanical power in a rotating shaft of the wind turbine, which may then be connected to an external load. The power generation of a wind turbine may be augmented by mounting a diffuser around the wind turbine. A diffuser, which may be a duct or a set of ducts may increase the wind pressure at the outlet of a wind turbine by decelerating the wind. Such augmentation in power generation of a wind turbine is especially useful when the size of the wind turbine is small, for example, diffusers may be utilized for small portable wind turbines. Although, blades of such small portable wind turbines are smaller in comparison with fixed installations, the augmentation of power generation provided by a diffuser may make up for the decrease in power conversion due to smaller blades.

Utilizing a properly designed diffuser may allow a wind turbine to reach the Betz-limit and even surpass it. Betz's law states that no turbine can capture more than 59.3% of the kinetic energy in wind. Despite all the advantages, utilizing diffusers in wind turbines may be associated with various negative issues, such as high drag forces working on the diffuser and the diminishing role of the diffuser in the upper range of wind velocities due to a continuous wind velocity speed-up. Drag forces acting on the diffuser may be so high that may lead to the cost of reinforcing the turbine structure overshadow the benefit of energy augmentation of the diffuser. There is, therefore, a need for a method for controlling wind velocity speed-up ratio and the drag force acting on a diffuser of a wind turbine. There is, further a need for a wind turbine augmented with a diffuser, where the size and the shape of the diffuser is controllable to allow for controlling wind velocity speed-up ratio and the drag force acting on the diffuser.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to an exemplary diffuser-augmented wind turbine. An exemplary diffuser-augmented wind turbine may include an annular diffuser extended between a first annular leading edge and a first annular trailing edge. An exemplary diffuser-augmented wind turbine may further include a rotor that may be disposed within an exemplary annular diffuser. An exemplary rotor may include a hub and at least one rotor blade that may be coupled to the exemplary hub. An exemplary rotor may be coaxial with an exemplary annular diffuser about a main axis. An exemplary rotor may be rotatable about an exemplary main axis on a rotor plane perpendicular to the exemplary main axis. An exemplary first annular leading edge may be configured to allow a first air stream to be provided to an exemplary rotor plane.

An exemplary diffuser-augmented wind turbine may further include a flared diffuser assembly. An exemplary flared diffuser assembly may include a second annular leading edge and a second annular trailing edge. An exemplary flared diffuser may be coaxially coupled to an exemplary annular diffuser about an exemplary main axis. An exemplary second leading edge may be in fluid communication with an exemplary first trailing edge. An exemplary second leading edge may be configured to allow a first air stream received from an exemplary first trailing edge to enter an exemplary flared diffuser assembly.

An exemplary flared diffuser assembly may further include a fixed flared diffuser. An exemplary fixed flared diffuser may include a first plurality of flared petals that may extend from an exemplary second annular leading edge toward an exemplary second annular trailing edge. Each exemplary flared petal of the first plurality of flared petals may include a flared curved conical segment with a first edge attached to an exemplary second annular leading edge and a second edge forming a portion of an exemplary second trailing edge. The first plurality of flared petals may be equally spaced apart around an exemplary second annular leading edge.

An exemplary flared diffuser assembly may further include a rotatable flared diffuser. An exemplary rotatable flared diffuser may include an annular leading edge that may be disposed within and encompassed by an exemplary second annular leading edge. An exemplary rotatable diffuser may include a second plurality of flared petals extending from an exemplary annular leading edge toward an exemplary second annular trailing edge. Each exemplary flared petal of the second plurality of flared petals may include a flared curved conical segment with a first edge attached to an exemplary second annular leading edge and a second edge forming a portion of an exemplary second trailing edge. An exemplary rotatable flared diffuser may be coaxial with an exemplary fixed flared diffuser about an exemplary main axis. An exemplary rotatable flared diffuser may be rotatable about an exemplary main axis. An exemplary diffuser-augmented wind turbine may further include a nacelle, where an exemplary hub may be rotatably coupled with an exemplary nacelle.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for the purpose of illustration and description only and are not intended as a definition of the limits of the present disclosure. Embodiments of the present disclosure will now be described by way of example in association with the accompanying drawings in which.

DETAILED DESCRIPTION

Figure 1:
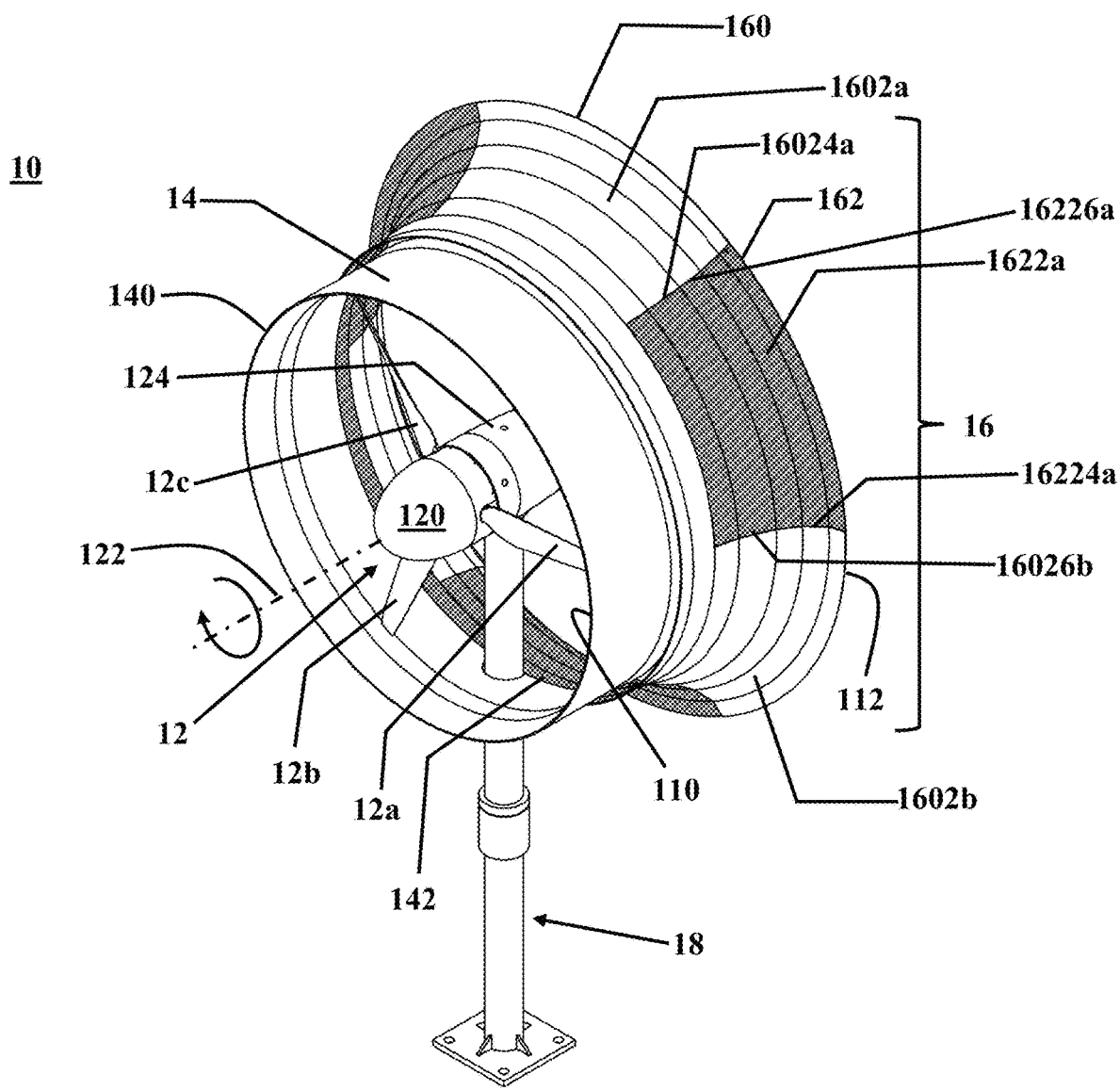
FIG. 1 illustrates a perspective view of a diffuser-augmented wind turbine, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

The present disclosure is directed to exemplary embodiments of an exemplary wind turbine that may be augmented by an exemplary variable geometry diffuser. An exemplary variable geometry diffuser may allow for augmenting an exemplary wind turbine to different extents by controlling the diffuser geometry. As used herein, augmenting or augmentation may refer to enhancement of power output of an exemplary wind turbine. An exemplary variable geometry diffuser may allow for increasing augmentation for lower air velocities and may allow for decreasing augmentation for higher air velocities. An exemplary variable geometry diffuser may include an exemplary annular diffuser and a flared diffuser assembly that may be coupled downstream of the exemplary annular diffuser. An exemplary annular diffuser of an exemplary variable geometry diffuser may be mounted around rotor blades of an exemplary wind turbine, such that exemplary rotor blades of an exemplary wind turbine may be encompassed by an exemplary annular diffuser. An exemplary flared diffuser assembly may be attached downstream of an outlet of an exemplary annular diffuser such that air passing through exemplary rotor blades within an exemplary annular diffuser may then enter an exemplary flared diffuser assembly. An exemplary flared diffuser assembly may be a curved diffuser that may flare outward from an axis of symmetry of the curved diffuser towards an outlet of an exemplary flared diffuser assembly. Consequently, flared diffuser assembly may define a diverging flow path with a curved inner surface with a small dimeter at an inlet of the diverging flow path and a larger diameter at an outlet of the diverging flow path. Such a diverging shape for an exemplary flared diffuser assembly may allow for achieving higher lift coefficients that may lead to an increase in mass flow of air and as a result may enhance the flow of air within an exemplary variable geometry diffuser. Since an exemplary variable geometry diffuser may be in fluid communication with exemplary rotor blades of an exemplary wind turbine, the lift achieved when utilizing such a diverging flared diffuser assembly may increase the air mass flow through exemplary rotor blades. Enhancing the flow of air through exemplary rotor blades may allow for more power per unit mass of air flow to be extracted from the air flow or wind passing through exemplary rotor blades of an exemplary wind turbine.

However, as wind velocities increase, a drag force that may be exerted on an exemplary diffuser of an exemplary wind turbine may increase as well. At a high wind speed, drag loads acting on an exemplary diffuser may be considerable and may be a major drawback in utilizing diffuser augmented wind turbines. An exemplary variable geometry diffuser may allow for addressing the issue of excessive loading that may be incurred by a diffuser-augmented wind turbine by changing the amount of drag force exerted on a diffuser-augmented wind turbine via changing geometry of an exemplary variable geometry diffuser.

An exemplary flared diffuser assembly of an exemplary variable geometry diffuser may be divided into two separate sections that together form the complete geometry of an exemplary flared diffuser assembly. A complete geometry of an exemplary flared diffuser assembly may refer to a complete diverging path, where an inner wall of the complete diverging path may flare outward towards an outlet of an exemplary flared diffuser assembly and the inner wall of the complete diverging path may completely enclose the passage between an inlet of an exemplary flared diffuser assembly and an outlet of an exemplary flared diffuser assembly. Exemplary sections of an exemplary flared diffuser assembly may include a fixed flared diffuser and a rotatable flared diffuser. An exemplary fixed flared diffuser may include an annular leading edge out of which three equally spaced apart flared petals may extend toward an outlet of an exemplary flared diffuser assembly. Each exemplary extended petal of an exemplary fixed flared diffuser may cover a portion of the fluid passage between an inlet of an exemplary flared diffuser assembly and an outlet of an exemplary flared diffuser assembly. For example, extended petals may be equally spaced apart petals that each may cover one sixth of the fluid passage between an inlet of an exemplary flared diffuser assembly and an outlet of an exemplary flared diffuser assembly. Accordingly, exemplary petals of an exemplary fixed flared diffuser may cover half of the fluid passage between an inlet of an exemplary flared diffuser assembly and an outlet of an exemplary flared diffuser assembly.

An exemplary rotatable flared diffuser may also include an annular leading edge out of which three equally spaced apart flared petals may extend toward an outlet of an exemplary flared diffuser assembly. An exemplary rotatable flared diffuser may be mounted coaxially with an exemplary fixed flared diffuser such that at a certain rotational angle of an exemplary rotatable flared diffuser, an exemplary rotatable flared diffuser and an exemplary fixed flared diffuser may form a complete diverging path. Three exemplary extended petals of an exemplary rotatable flared diffuser may cover half of the fluid passage between an inlet of an exemplary flared diffuser assembly and an outlet of an exemplary flared diffuser assembly. Such two-section design for an exemplary flared diffuser assembly may allow for opening the wall of an exemplary flared diffuser assembly between 50% and 100%. For example, at high wind velocities, 50% of an exemplary diffuser wall may be opened by rotating an exemplary rotatable flared diffuser relative to an exemplary fixed flared diffuser. This way, a smaller portion of an outer surface of an exemplary diffuser may be exposed to high wind velocities and as a result the drag force acting on an exemplary diffuser may be decreased.

Consequently, at low wind velocities where the drag forces acting on an exemplary diffuser are not that considerable, an exemplary rotatable flared diffuser may be rotated to a rotational position where an exemplary rotatable flared diffuser and an exemplary fixed flared diffuser may form a complete diverging path. However, at higher wind velocities where drag forces acting on an exemplary diffuser may be considerable, an exemplary rotatable flared diffuser may be rotated to a position where exemplary petals of an exemplary rotatable flared diffuser may be positioned immediately below exemplary petals of an exemplary fixed flared diffuser. Here, only one half of an outer surface of an exemplary flared diffuser assembly may be exposed to the wind.

An exemplary variable geometry diffuser may be equipped with a control mechanism that may utilize a calibration relationship between wind velocities and opening percentages of a wall of an exemplary flared diffuser assembly of an exemplary variable geometry diffuser, to urge an exemplary rotatable flared diffuser to rotate to a predetermined rotational location based at least in part on the wind velocities. An exemplary control mechanism may be coupled in data communication to a wind velocity censor. An exemplary control mechanism may be configured to receive a wind velocity value from an exemplary wind velocity sensor and based on the received wind velocity and an established calibration relationship to calculate a rotational position for an exemplary rotatable flared diffuser of an exemplary flared diffuser assembly of an exemplary variable geometry diffuser.

FIG. 1 illustrates a perspective view of a diffuser-augmented wind turbine 10, consistent with one or more exemplary embodiments of the present disclosure. In an exemplary embodiment, diffuser-augmented wind turbine 10 may include a rotor 12, which may include rotor blades 12a-c that may be joined at a central hub 120. In an exemplary embodiment, rotor 12 may be rotatable about a main axis 122 of diffuser-augmented wind turbine 10. Central hub 120 may be coupled with a nacelle 124 via a shaft (not illustrated). In an exemplary embodiment, nacelle 124 may be a housing that may house power generating components of diffuser-augmented wind turbine 10, such as generators, gearboxes, and drive trains that are not illustrated for purpose of simplicity.

In an exemplary embodiment, diffuser-augmented wind turbine 10 may further include an annular diffuser 14 that may be mounted coaxially with main axis 122 around rotor blades 12a-c. A narrow gap may be provided between an inner surface of annular diffuser 14 and tips of rotor blades 12a-c. In an exemplary embodiment, annular diffuser 14 may include a leading edge 140 that may function as an annular inlet end 110 of diffuser-augmented wind turbine 10 and a trailing edge 142. Annular diffuser 14 may extend along main axis 122 between leading edge 140 and trailing edge 142. In an exemplary embodiment, both leading edge 140 and trailing edge 142 of annular diffuser 14 may be annular or round. In an exemplary embodiment, annular diffuser 14 may encompass and may be in fluid communication with rotor blades 12a-c, such that an air stream passing through annular diffuser 14 may also pass through rotor blades 12a-c.

In an exemplary embodiment, diffuser-augmented wind turbine 10 may further include a flared diffuser assembly 16 that may be mounted coaxially with main axis 122 of diffuser-augmented wind turbine 10. In an exemplary embodiment, flared diffuser assembly 16 may include a fixed flared diffuser 160 and a rotatable flared diffuser 162 that may be coaxially coupled with each other. In an exemplary embodiment, rotatable flared diffuser 162 may be rotatable about main axis 122. In an exemplary embodiment, based on the rotational position of rotatable flared diffuser 162 about main axis 122, a wall of flared diffuser assembly 16 may be completely closed or partially open. In a completely closed state, flared diffuser assembly 16 may be in a shape of a flared truncated curved cone. In an exemplary embodiment, an annular outlet end 112 of diffuser-augmented wind turbine 10 may be defined by trailing edges of fixed flared diffuser 160 and a rotatable flared diffuser 162, as will be discussed in the following paragraphs.

In an exemplary embodiment, central hub 120, nacelle 124, annular diffuser 14, fixed flared diffuser 160, and rotatable flared diffuser 162 may be mounted coaxially about main axis 122. In an exemplary embodiment, diffuser-augmented wind turbine 10 may be supported by a tower structure 18.

Figure 3A:
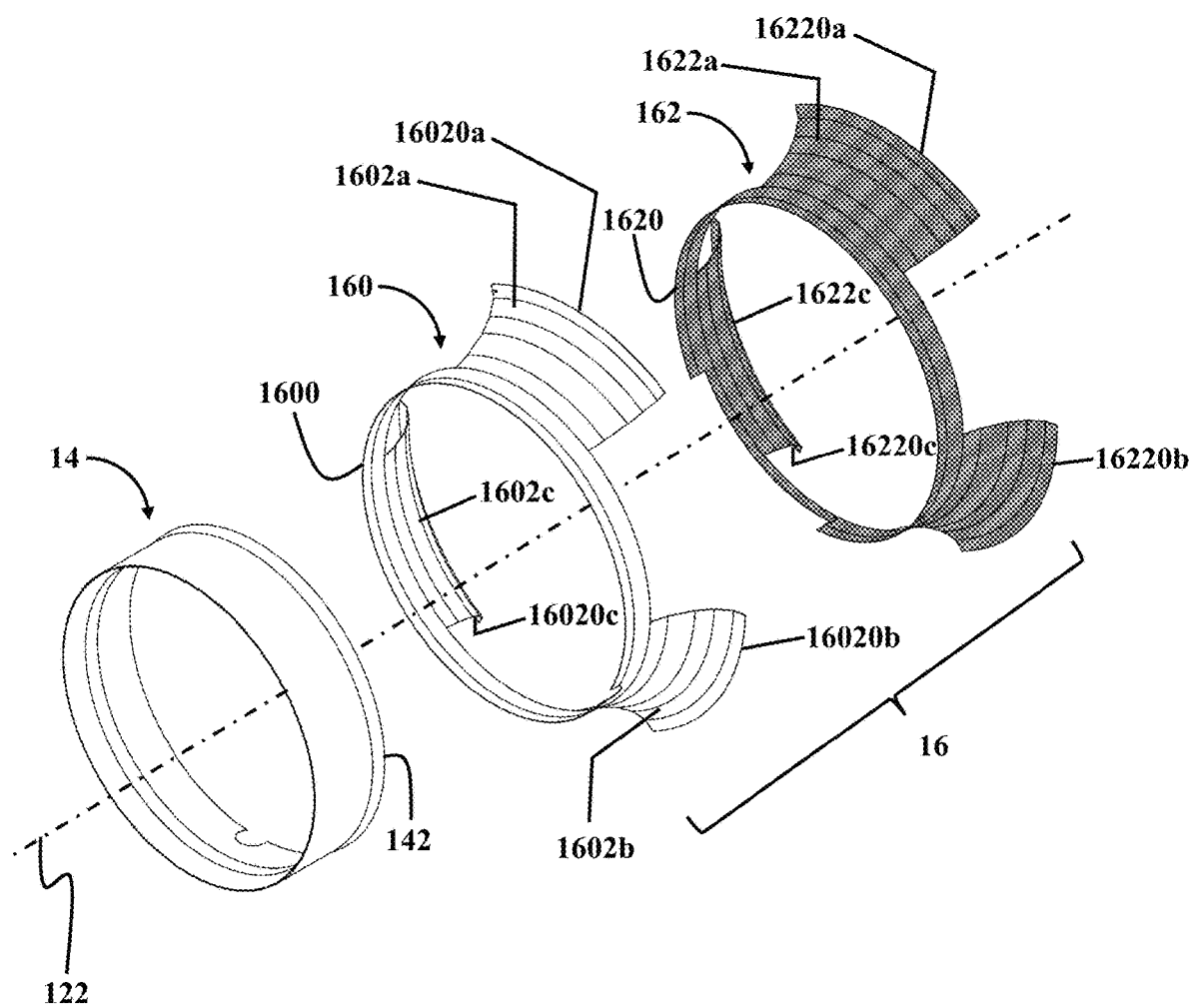
FIG. 3A illustrates an exploded view of an annular diffuser and a flared diffuser assembly, consistent with one or more exemplary embodiments of the present disclosure.

FIG. 3A illustrates an exploded view of annular diffuser 14 and flared diffuser assembly 16, consistent with one or more exemplary embodiments of the present disclosure. In an exemplary embodiment, fixed flared diffuser 160 may include an annular leading edge 1600 that may be positioned in line with or slightly upstream of trailing edge 142 of annular diffuser 14. In an exemplary embodiment, annular leading edge 1600 of fixed flared diffuser 160 may be coupled in fluid communication with trailing edge 142 of annular diffuser 14, such that wind blowing through annular diffuser 14 may exit annular diffuser 14 via trailing edge 142 and may enter fixed flared diffuser 160 via annular leading edge 1600. In an exemplary embodiment, fixed flared diffuser 160 may further include first flared petals 1602a-c that may extend between annular leading edge 1600 and annular outlet end 112 of diffuser-augmented wind turbine 10. In an exemplary embodiment, first flared petals 1602a-c may flare out toward annular outlet end 112 of diffuser-augmented wind turbine 10. As used herein, flaring out may refer to being curved outwardly with respect to main axis 122. In an exemplary embodiment, fixed flared diffuser 160 may include at least one first flared petal that may be structurally similar to first flared petals 1602a-c. In an exemplary embodiment, fixed flared diffuser 160 may include more than three flared petals that may be structurally similar to first flared petals 1602a-c.

Figure 3B:
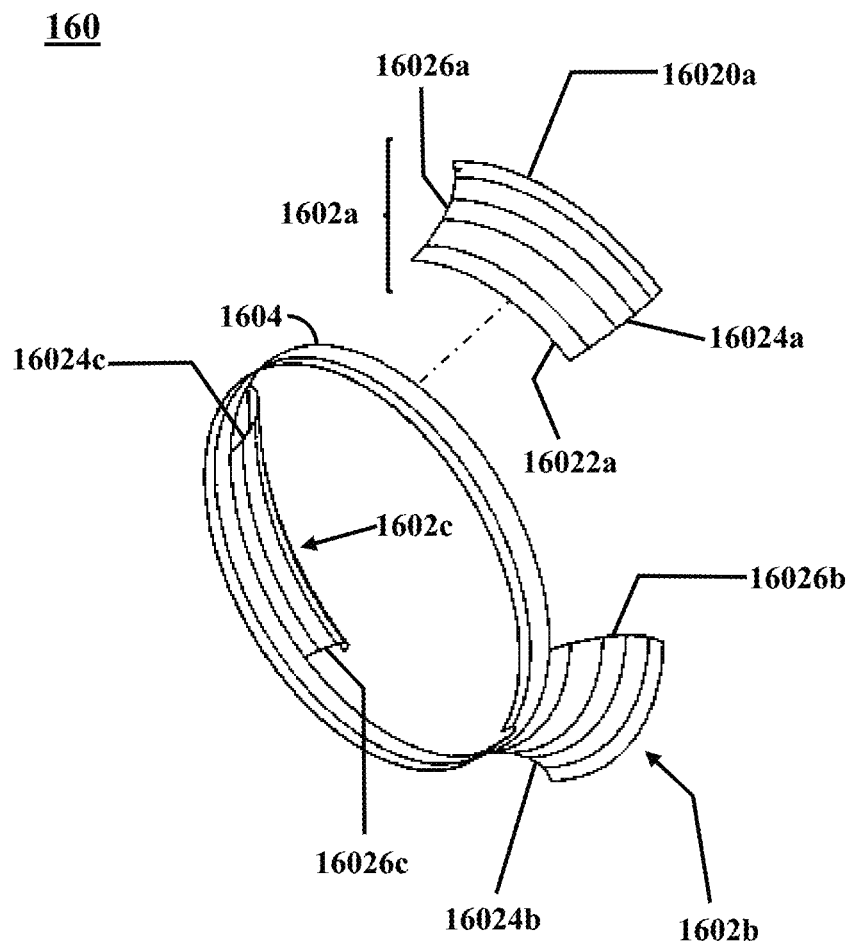
FIG. 3B illustrates an exploded view of a fixed flared diffuser, consistent with one or more exemplary embodiments of the present disclosure.

FIG. 3B illustrates an exploded view of fixed flared diffuser 160, consistent with one or more exemplary embodiments of the present disclosure. In an exemplary embodiment, fixed flared diffuser 160 may include an annular ring 1604 and first flared petals 1602a-c that may either be integrally formed with or attached to annular ring 1604. In an exemplary embodiment, each flared petal of first flared petals 1602a-c may include a leading edge attached to or integrally formed with annular ring 1604, and a trailing edge that may cover a portion of annular outlet end 122 of diffuser-augmented wind turbine 10. For example, first flared petal 1602a may include leading edge 16022a that may be attached to or integrally formed with annular ring 1604. First flared petal 1602a may extend between leading edge 16022a and a trailing edge 16020a confined between a first side edge 16024a and a second side edge 16026a. In an exemplary embodiment, leading edge 16022a and trailing edge 16020a may include arcs of predetermined angles between first side edge 16024a and second side edge 16026a. In an exemplary embodiment, first side edge 16024a may be a curve that may curve outward with respect to main axis 122 and first flared petal 1602a may be formed by lathing first side edge 16024a about main axis 122.

In an exemplary embodiment, first flared petal 1602b may be structurally similar to first flared petal 1602a. First flared petal 1602b may include a first side edge 16024b and a second side edge 16026b. In an exemplary embodiment, first flared petal 1602c may be structurally similar to first flared petal 1602a and first flared petal 1602b. First flared petal 1602c may include a first side edge 16024c and a second side edge 16026c.

In an exemplary embodiment, first flared petals 1602a-c may be equally spaced apart about a periphery of annular leading edge 1600. In an exemplary embodiment, annular outlet end 122 of diffuser-augmented wind turbine 10 may be a 360° round outlet, a portion of which may be covered by trailing edges 16020a-c of first flared petals 1602a-c. For example, trailing edges 16020a-c of first flared petals 1602a-c may be 60° arcs that together may cover 180° of a 360° annular outlet end 112 of diffuser-augmented wind turbine 10. For example, leading edge 16022a and trailing edge 16020a may include 60° arcs extended between first side edge 16024a and second side edge 16026a.

In an exemplary embodiment, each flared petal of first flared petals 1602a-c may flare out towards annular outlet end 112 of diffuser-augmented wind turbine 10. As used herein, each flared petal of first flared petals 1602a-c flaring out may refer to each flared petal of first flared petals 1602a-c being curved outward with respect to main axis 122 as each flared petal of first flared petals 1602a-c extends from leading edge of that flared petal to the respective trailing edge of that flared petal. For example, flared petal 1602a may flare out with respect to main axis 122 as flared petal 1602a extends from leading edge 16022a towards trailing edge 16020a.

In an exemplary embodiment, rotatable flared diffuser 162 may include an annular leading edge 1620 that may be positioned in line with or slightly upstream of trailing edge 142 of annular diffuser 14. In an exemplary embodiment, annular leading edge 1620 of rotatable flared diffuser 162 may be rotatably coupled with annular leading edge 1600 of fixed flared diffuser 160. For example, annular leading edge 1620 may fit within annular leading edge 1600 such that leading edge 1600 may encompass annular leading edge 1620. In an exemplary embodiment, annular leading edge 1620 may rotate about main axis 122 and may be in fluid communication with trailing edge 142 of annular diffuser 14, such that wind blowing through annular diffuser 14 may exit annular diffuser 14 via trailing edge 142 and may enter rotatable flared diffuser 162 via annular leading edge 1620. In an exemplary embodiment, rotatable flared diffuser 162 may further include second flared petals 1622a-c that may extend between annular leading edge 1620 and annular outlet end 112 of diffuser-augmented wind turbine 10. In an exemplary embodiment, second flared petals 1622a-c may flare out toward annular outlet end 112 of diffuser-augmented wind turbine 10. In an exemplary embodiment, rotatable flared diffuser 162 may include at least one second flared petal that may be structurally similar to second flared petals 1622a-c. In an exemplary embodiment, rotatable flared diffuser 162 may include more than three flared petals that may be structurally similar to second flared petals 1622a-c.

Figure 3C:
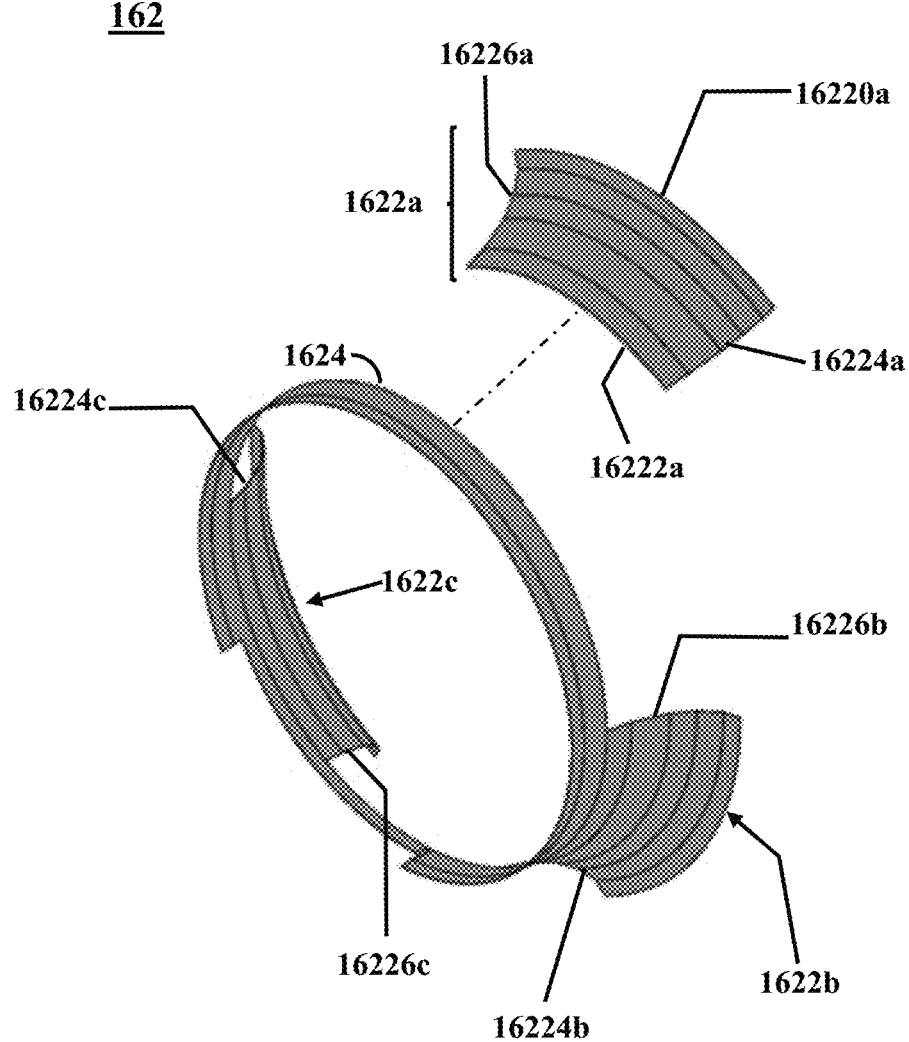
FIG. 3C illustrates an exploded view of a rotatable flared diffuser, consistent with one or more exemplary embodiments of the present disclosure.

FIG. 3C illustrates an exploded view of rotatable flared diffuser 162, consistent with one or more exemplary embodiments of the present disclosure. In an exemplary embodiment, rotatable flared diffuser 162 may be structurally similar to fixed flared diffuser 160. In an exemplary embodiment, rotatable flared diffuser 162 may include an annular ring 1624 and second flared petals 1622a-c that may either be integrally formed with or attached to annular ring 1624. In an exemplary embodiment, each flared petal of second flared petals 1622a-c may include a leading edge attached to or integrally formed with annular ring 1624, and a trailing edge that may cover a portion of annular outlet end 122 of diffuser-augmented wind turbine 10. For example, second flared petal 1622a may include leading edge 16222a that may be attached to or integrally formed with annular ring 1624. Second flared petal 1622a may extend between leading edge 16222a and a trailing edge 16220a confined between a first side edge 16224a and a second side edge 16226a. In an exemplary embodiment, leading edge 16222a and trailing edge 16220a may include arcs of predetermined angles between first side edge 16224a and second side edge 16226a. In an exemplary embodiment, first side edge 16224a may be a curve that may curve outward with respect to main axis 122 and second flared petal 1622a may be formed by lathing first side edge 16224a about main axis 122.

In an exemplary embodiment, second flared petal 1622b may be structurally similar to second flared petal 1622a. Second flared petal 1622b may include a first side edge 16224b and a second side edge 16226b. In an exemplary embodiment, second flared petal 1622c may be structurally similar to second flared petal 1622a and second flared petal 1622b. Second flared petal 1622c may include a first side edge 16224c and a second side edge 16226c.

In an exemplary embodiment, second flared petals 1622a-c may be equally spaced apart about a periphery of annular leading edge 1620. In an exemplary embodiment, annular outlet end 122 of diffuser-augmented wind turbine 10 may be a 360° round outlet, a portion of which may be covered by trailing edges 16220a-c of second flared petals 1622a-c. For example, trailing edges 16220a-c of second flared petals 1622a-c may be 60° arcs that together may cover 180° of a 360° annular outlet end 112 of diffuser-augmented wind turbine 10. For example, leading edge 16222a and trailing edge 16220a may include 60° arcs extended between first side edge 16224a and second side edge 16226a.

In an exemplary embodiment, each flared petal of second flared petals 1622a-c may flare out towards annular outlet end 112 of diffuser-augmented wind turbine 10. As used herein, each flared petal of second flared petals 1622a-c flaring out may refer to each flared petal of second flared petals 1622a-c being curved outward with respect to main axis 122 as each flared petal of second flared petals 1622a-c extends from leading edge of that flared petal to the respective trailing edge of that flared petal. For example, second flared petal 1622a may flare out with respect to main axis 122 as second flared petal 1622*a* extends from leading edge 16222*a* towards trailing edge 16220*a*.

Figure 4A:
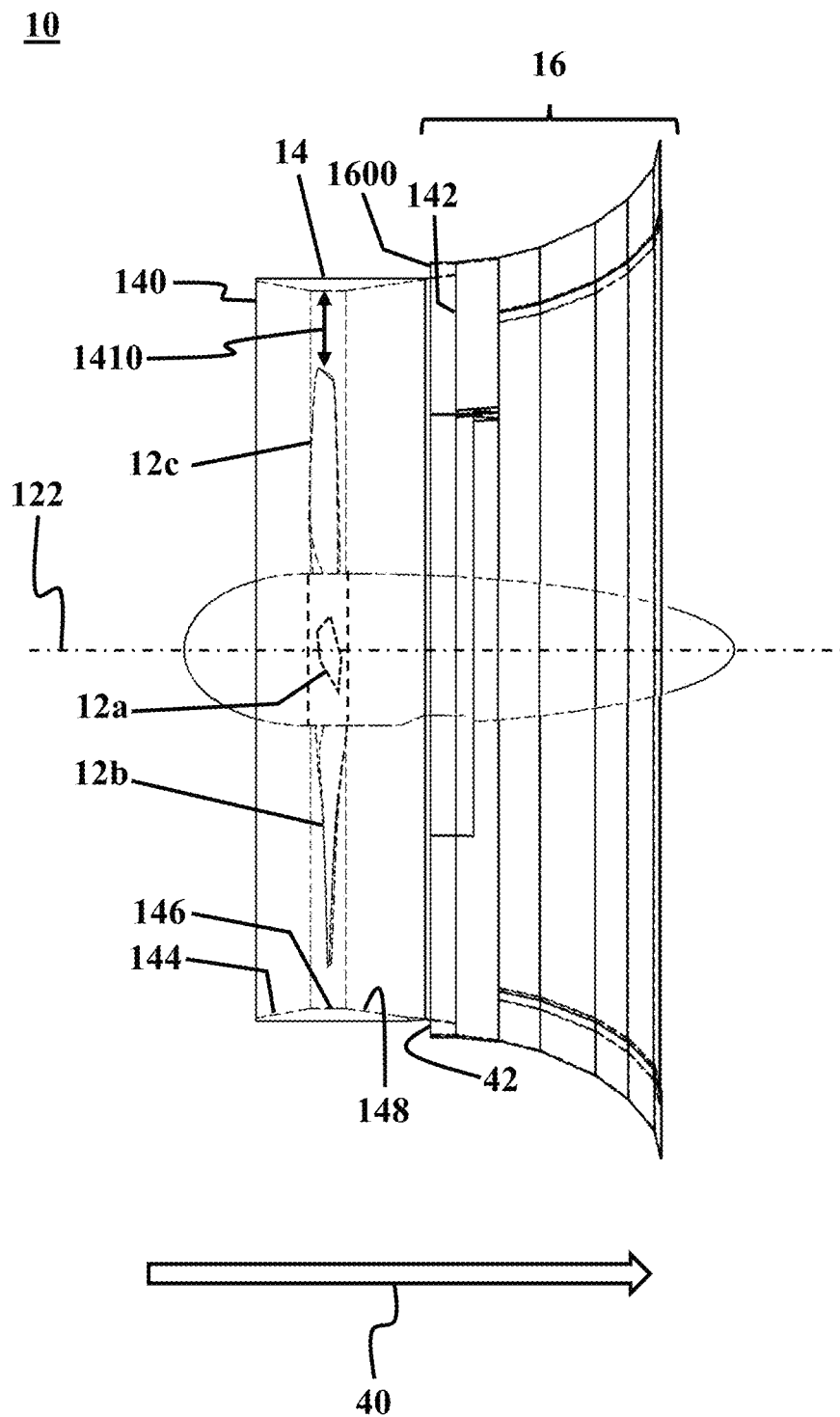
FIG. 4A illustrates a side view of a diffuser-augmented wind turbine, consistent with one or more exemplary embodiments of the present disclosure.
Figure 4B:
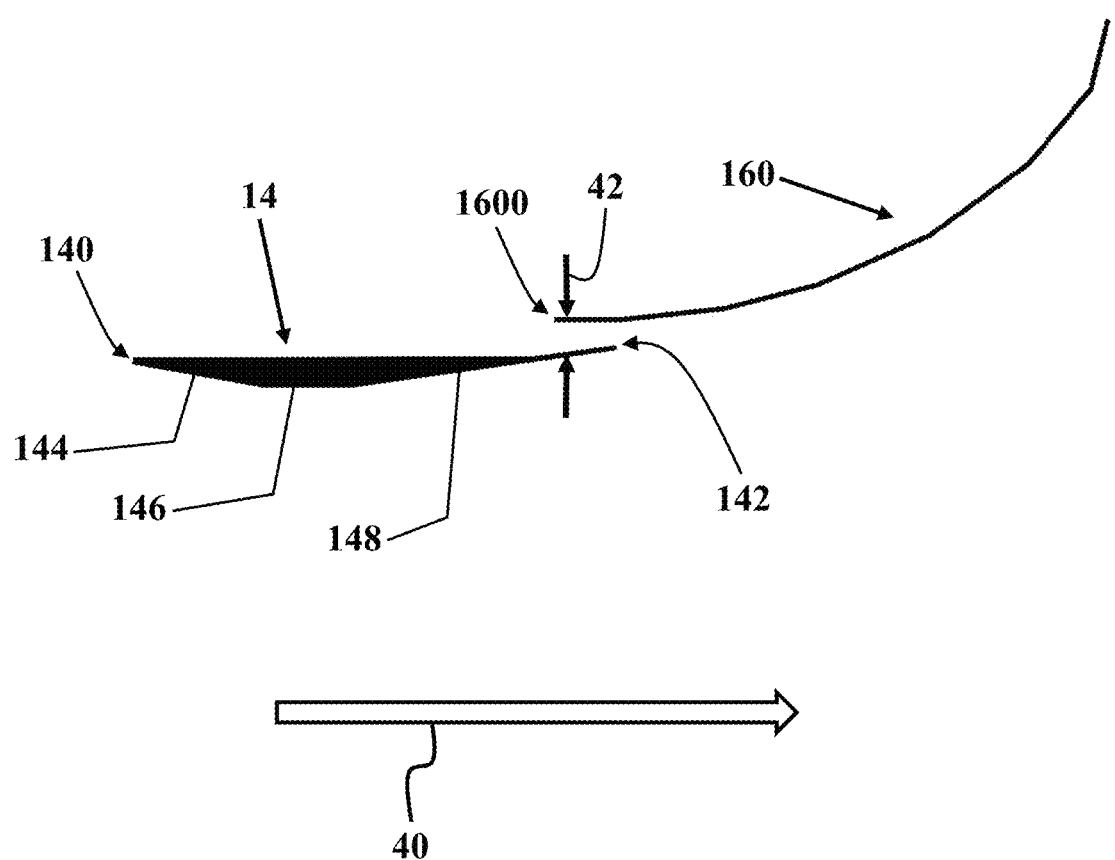
FIG. 4B illustrates profiles of an annular diffuser and a fixed flared diffuser, consistent with one or more exemplary embodiments of the present disclosure.

FIG. 4A illustrates a side view of diffuser-augmented wind turbine 10, consistent with one or more exemplary embodiments of the present disclosure. FIG. 4B illustrates profiles of annular diffuser 14 and fixed flared diffuser 160, consistent with one or more exemplary embodiments of the present disclosure. In an exemplary embodiment, leading edge 140 and trailing edge 142 of annular diffuser 14 may be annular or in other words round. Annular diffuser 14 may extend between leading edge 140 and trailing edge 142 in three sections, namely, a converging section 144, a straight section 146, and a diverging section 148. In an exemplary embodiment, converging section 144 may be a section of reducing diameter that extends from leading edge 140 towards a plane of rotor blades 12*a-c*. As used herein, the plane of rotor blades 12*a-c* may refer to a plane define by the tips of rotor blades 12*a-c*, where the plane may be perpendicular to main axis 122. Wind blowing through diffuser-augmented wind turbine 10 may pass the plane of rotor blades 12*a-c*. In an exemplary embodiment, straight portion 146 may be a portion of annular diffuser 14 that encompasses rotor blades 12*a-c*. A small gap 1410 may be defined between an inner surface of straight portion 146 and tips of rotor blades 12*a-c*. In an exemplary embodiment, diverging portion 148 may follow straight portion 146 and may function as an ejector. Diverging portion 148 extends towards trailing edge 142 of annular diffuser 14. In other words, an air stream may enter annular diffuser through annular leading edge 140 and then may pass through converging section 144. After that, the air stream may pass through the plane of rotor blades 12*a-c* through straight portion 146 and then the air flow may exit through diverging section 148 towards trailing edge 142. In an exemplary embodiment, energy of an air stream that may enter leading edge 140 of annular diffuser 14 may be extracted by rotor blades 12*a-c*.

In an exemplary embodiment, leading edge 1600 of fixed flared diffuser 160 may be in line with or partially upstream of trailing edge 142 of annular diffuser 14. Referring to FIGS. 4A and 4B, in an exemplary embodiment, leading edge 1600 of fixed flared diffuser 160 may be partially upstream of trailing edge 142 of annular diffuser 14. As used herein, upstream and downstream may be defined based on the wind flow direction. For example, in a wind flow with a direction shown by arrow 40, upstream is defined at leading edge 140 and downstream is defined as any point after the upstream in the direction shown by arrow 40. For example, leading edge 1600 of fixed flared diffuser 160 being partially upstream of trailing edge 142 of annular diffuser 14 may refer to trailing edge 142 of annular diffuser 14 being extended partially beyond leading edge 1600 of fixed flared diffuser 160 in the direction shown by arrow 40.

In an exemplary embodiment, fixed flared diffuser 160 may be coupled with annular diffuser 14 such that an annular gap 42 may exist between leading edge 1600 of fixed flared diffuser 160 and trailing edge 142 of annular diffuser 14. In an exemplary embodiment, annular gap 42 may allow for an air stream to bypass annular diffuser 14 and directly enter flared diffuser assembly 16. In an exemplary embodiment, an air stream exiting annular diffuser 14 may be mixed with an air stream entering through annular gap 42 and may enter flared diffuser assembly 16. In an exemplary embodiment, leading edge 1600 of fixed flared diffuser 160 may be fixedly attached to trailing edge 142 of annular diffuser 14. In an exemplary embodiment, leading edge 140 may be upstream of rotor blades 12*a-c*.

Figure 5:
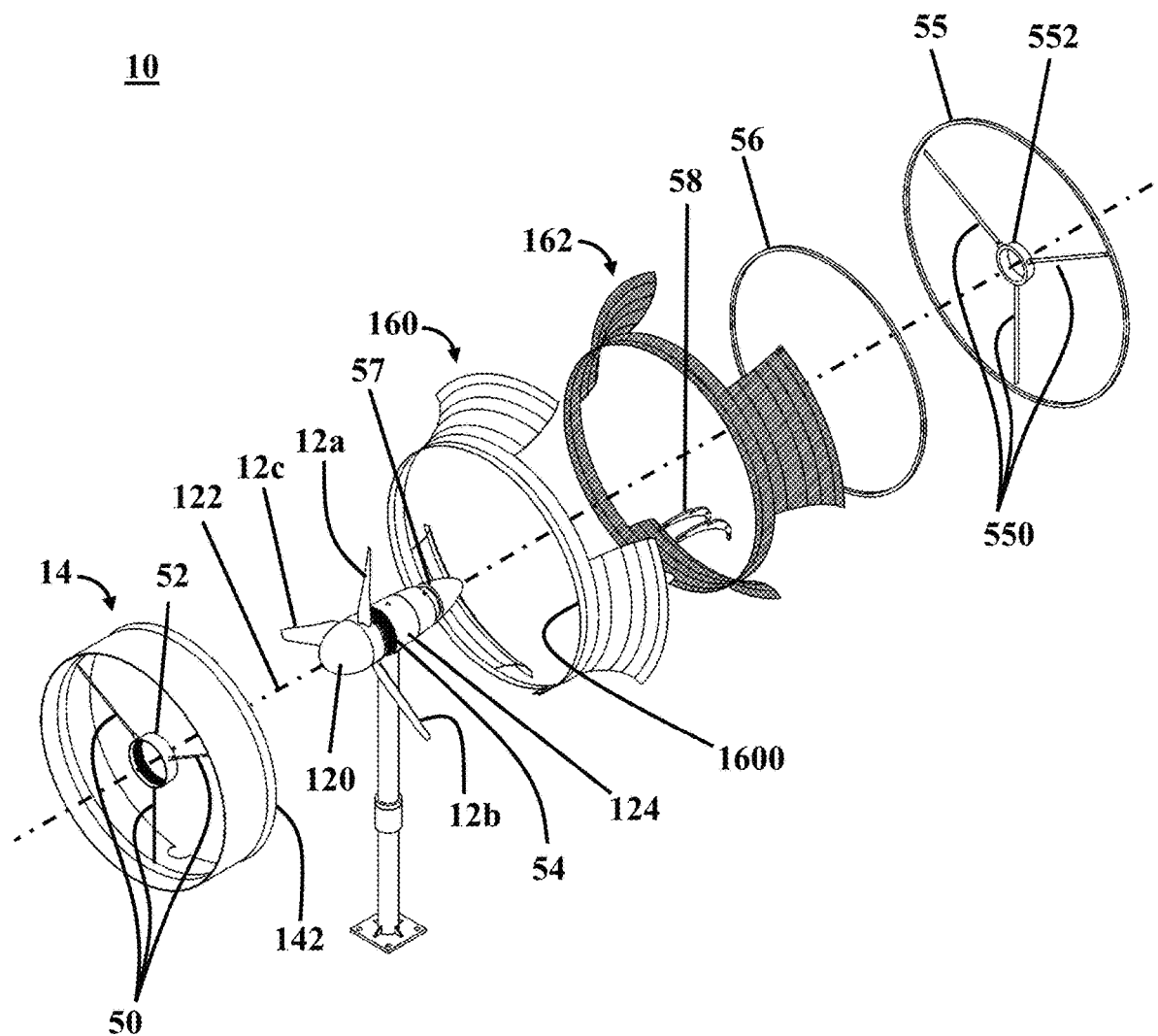
FIG. 5 illustrates an exploded view of a diffuser-augmented wind turbine, consistent with one or more exemplary embodiments of the present disclosure.

FIG. 5 illustrates an exploded view of diffuser-augmented wind turbine 10, consistent with one or more exemplary embodiments of the present disclosure. In an exemplary embodiment, annular diffuser 14 may be supported on nacelle 124 by utilizing struts 50. In an exemplary embodiment, struts 50 may be connected to nacelle 124 via first connecting ring 52 that may be disposed within a first groove 54 on nacelle 124. In an exemplary embodiment, rotor blades 12*a-c* may be mounted on nacelle 124 via central hub 120, such that rotor blades 12*a-c* may be rotatable within and coaxial with annular diffuser 14 about main axis 122.

In an exemplary embodiment, fixed flared diffuser 160 may be fixedly mounted on trailing edge 142 of annular diffuser 14. For example, fixed flared diffuser 160 may be connected to trailing edge 142 utilizing coupling member 55 that may include struts 550 and coupling ring 552. In an exemplary embodiment, coupling ring 552 may be disposed within coupling groove 57 on nacelle 124 downstream of rotor blades 12*a-c*. that may allow for mounting fixed flared diffuser 160 on trailing edge 142 of annular diffuser 14, such that small gap 1410 may be formed between trailing edge 142 and leading edge 1600 of fixed flared diffuser 160. In an exemplary embodiment, fixed flared diffuser 160 may further be coupled with nacelle 124 via an extra ring 56 that may be coupled with coupling member 55 by a number of coupling struts 58.

In an exemplary embodiment, rotatable flared diffuser 162 may be coaxially disposed within fixed flared diffuser 160, such that rotatable flared diffuser 124 may be rotated relative to nacelle 124 about main axis 122. In exemplary embodiments, such rotation of rotatable flared diffuser within fixed flared diffuser may allow for changing a shape of flared diffuser assembly 16.

Figure 2A:
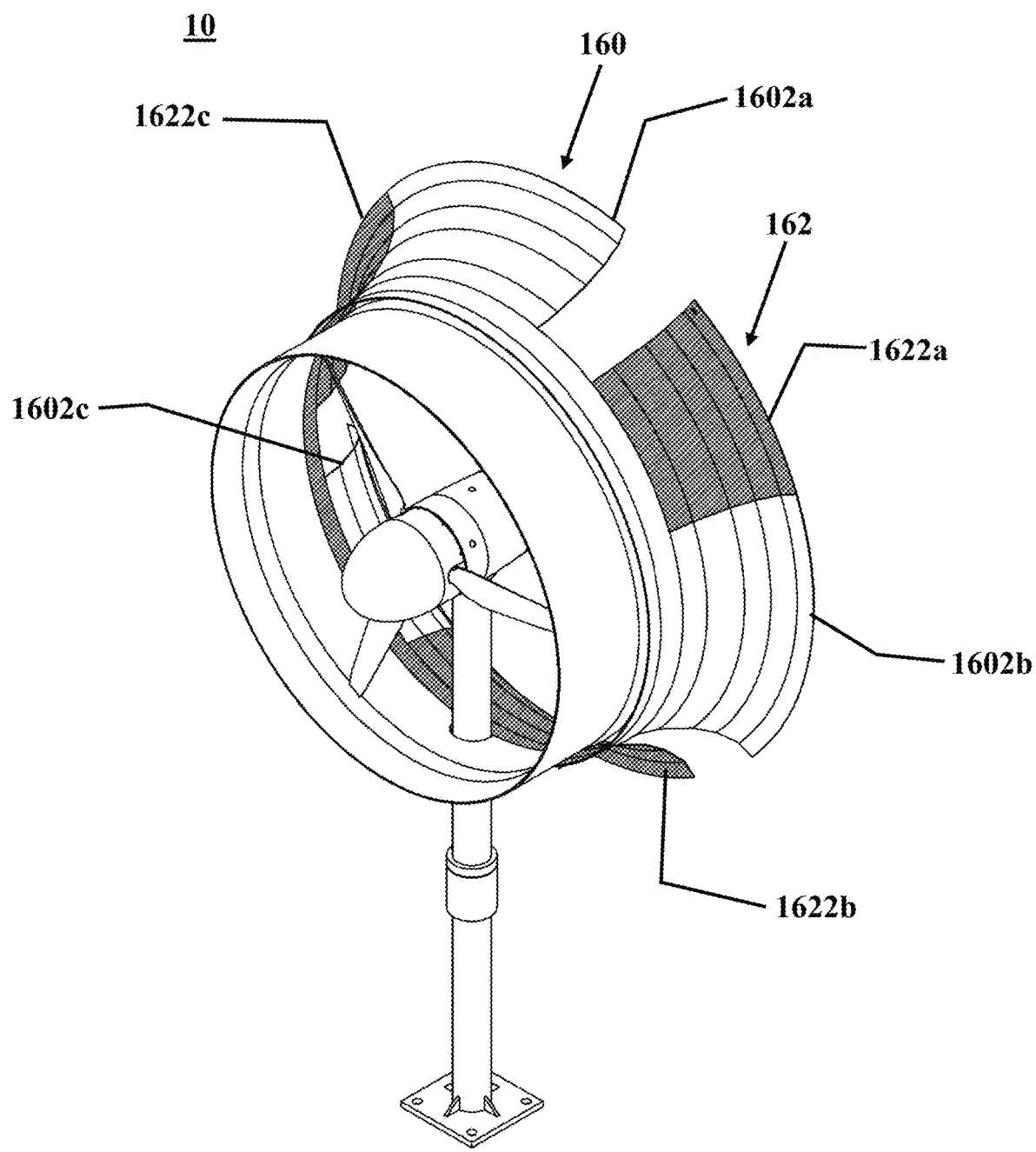
FIGS. 2A-2C illustrate perspective views of a diffuser-augmented wind turbine with different geometries of a flared diffuser assembly, consistent with one or more exemplary embodiments of the present disclosure.
Figure 2B:
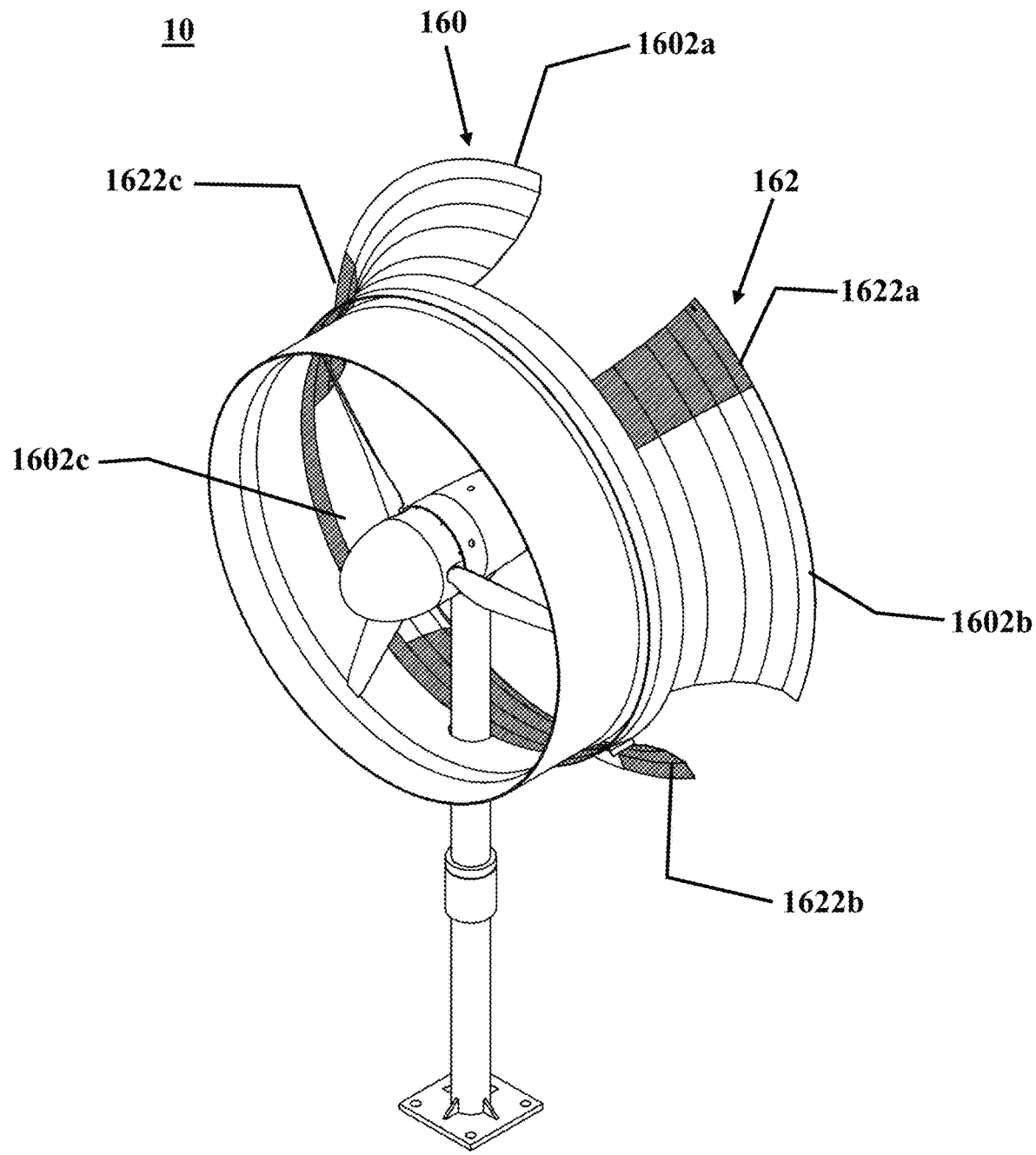
Figure 2C:
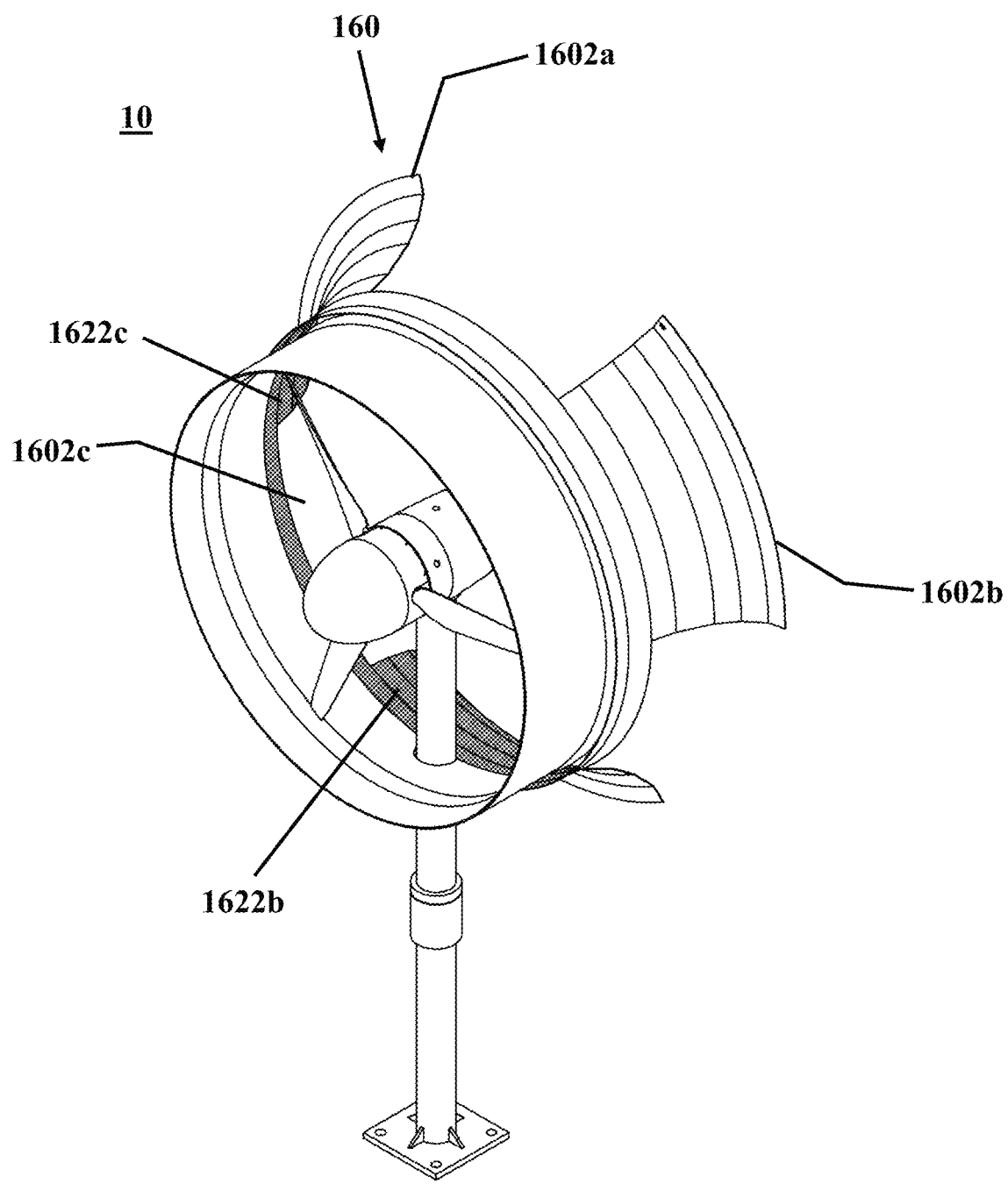

FIGS. 2A-2C illustrate perspective views of diffuser-augmented wind turbine 10 with flared diffuser assembly 16 with rotatable flared diffuser 162 at different rotational positions, consistent with one or more exemplary embodiments of the present disclosure. In an exemplary embodiment, a rotational position of rotatable flared diffuser 162 may be defined with respect to main axis 122. In an exemplary embodiment, rotatable flared diffuser 162 may be rotated to a first rotational position where second flared petals 1622*a-c* of rotatable flared diffuser 162 may be positioned in empty spaces between each pair of first flared petals 1602*a-c*, such that trailing edges 16220*a-c* and trailing edges 16020*a-c* may form 360° annular outlet end 112 of diffuser-augmented wind turbine 10 as illustrated in FIG. 1. In an exemplary embodiment, in the first rotational position, edges of each flared petal of second flared petals 1622*a-c* may be positioned in line with respective edges of adjacent flared petals of first flared petals 1602*a-c*. In other words, a first side edge of each flared petal of second flared petals 1622*a-c* may be positioned in line with an edge of a respective adjacent flared petal of first flared petals 1602*a-c* and a second side edge of each flared petal of second flared petals 1622*a-c* may be positioned in line with an edge of a respective adjacent flared petal of first flared petals 1602*a-c*. For example, FIG. 1 illustrates the first rotational position of rotatable flared diffuser 162, in which, second flared petal 1622*a* is positioned between first flared petal 1602*a* and first flared petal 1602*b*. As used herein, second flared petal 1622*a* being positioned between first flared petal 1602*a* and first flared petal 1602*b* may refer to a position where first side edge 16224*a* of second flared petal 1622*a* is in line with second side edge 16026*b* of first flared petal 1602*b* and second side edge 16226a of second flared petal 1622*a* is in line with first side edge 16024*a* of first flared petal 1602*a*.

In the first rotational position of rotatable flared diffuser 162 as described above, flared diffuser assembly 16 may have a truncated curved cone shape.

In an exemplary embodiment, rotatable flared diffuser 162 may be rotated to a rotational position, where a portion of empty spaces between each pair of first flared petals 1602*a-c* may be filled with second flared petals 1622*a-c* of rotatable flared diffuser 162, for example, as illustrated in FIGS. 2A and 2B. In an exemplary embodiment, rotatable flared diffuser 162 may be rotated to a second rotational position, where none of empty spaces between each pair of first flared petals 1602*a-c* may be filled with second flared petals 1622*a-c* of rotatable flared diffuser 162, for example, as illustrated in FIG. 2C.

In an exemplary embodiment, in the second rotational position of rotatable flared diffuser 162, edges of each flared petal of second flared petals 1622*a-c* may be positioned in line with respective edges of a corresponding flared petal of first flared petals 1602*a-c*. For example, first side edge 16224*a* of second flared petal 1622*a* may be positioned in line with first side edge 16024*a* of first flared petal 1602*a*. First side edge 16224*b* of second flared petal 1622*b* may be positioned in line with first side edge 16024*b* of first flared petal 1602*b*. First side edge 16224*c* of second flared petal 1622*c* may be positioned in line with first side edge 16024*c* of first flared petal 1602*c*.

In the second rotational position as described above, second flared petals 1622*a-c* of rotatable flared diffuser 162 may be positioned immediately below first flared petals 1602*a-c* of fixed flared diffuser 160. In an exemplary embodiment, such rotation of rotatable flared diffuser 162 with respect to fixed flared diffuser 160 between the first rotational position and the second rotational position may allow for changing the shape of flared diffuser assembly 16 from a complete flared diffuser with an annular or round outlet to a flared diffuser with an outlet that only 180° of its round outlet is covered by trailing edges 16020*a-c* as illustrated in FIG. 2C.

Figure 6:
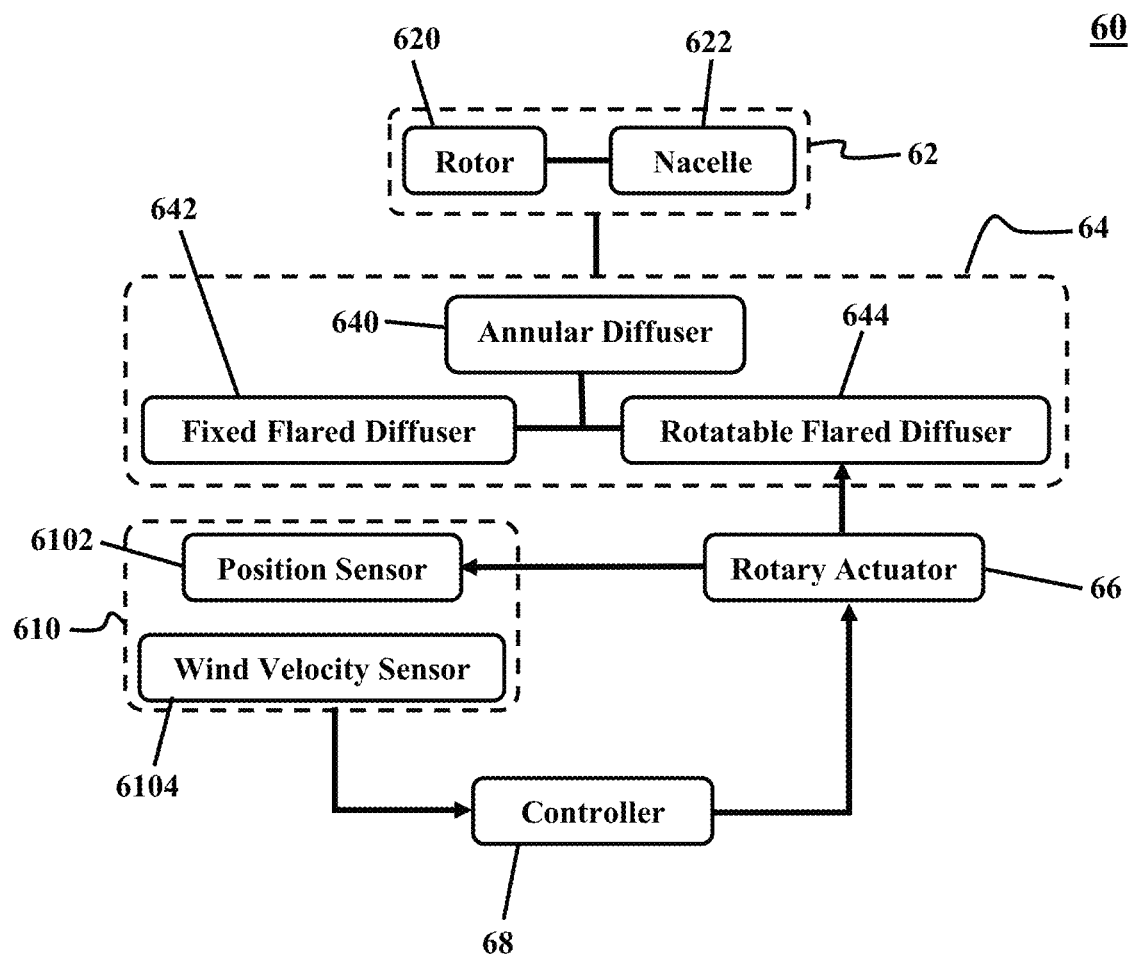
FIG. 6 illustrates a diffuser-augmented wind turbine system, consistent with one or more exemplary embodiments of the present disclosure.

FIG. 6 illustrates a diffuser-augmented wind turbine system 60, consistent with one or more exemplary embodiments of the present disclosure. In an exemplary embodiment, diffuser-augmented wind turbine 10 may be an implementation of system 60. In an exemplary embodiment, system 60 may include a wind turbine 62 that may include a rotor 620 that may be similar to rotor 12 and a nacelle 622 that may be similar to nacelle 124. In an exemplary embodiment, rotor 12 may be coupled with nacelle 124 via a shaft and may transfer the mechanical power extracted from an air stream to nacelle 124. In an exemplary embodiment, nacelle 124 may include generating parts of wind turbine 62, for example, an electric generator that may receive the mechanical power and may convert the mechanical power into electricity.

In an exemplary embodiment, system 60 may further include a variable geometry diffuser 64 that may be coupled with wind turbine 62 to augment the energy output of wind turbine 62 by enhancing the mass flow rate of air passing through wind turbine 62. Variable geometry diffuser 64 may generate a lift within the air flow through wind turbine 62, which may lead to an increase in air mass flow passing through wind turbine 62. Therefore, more power per unit mass of air flow may be extracted from the air flow or wind passing through exemplary rotor blades of wind turbine 62. In an exemplary embodiment, variable geometry diffuser 64 may include an annular diffuser 640 that may be similar to annular diffuser 14, a fixed flared diffuser 642 that may be similar to fixed flared diffuser 160, and a rotatable flared diffuser 644 that may be similar to rotatable flared diffuser 162. In an exemplary embodiment, annular diffuser 640 may be coupled with wind turbine 62 such that annular diffuser 640 may be mounted coaxial with rotor 620 and nacelle 622 about a main axis. Annular diffuser 640 may encompass rotor 620 similar to annular diffuser 14 encompassing rotor 12 in diffuser-augmented wind turbine 12. In an exemplary embodiment, annular diffuser 640 may be in fluid communication with rotor 620, i.e., an air stream passing through annular diffuser 640 may pass through rotor 620 and the energy of the air stream may be extracted by rotor 620. In an exemplary embodiment, the extracted energy by rotor 620 may be converted to electricity by a generator housed within nacelle 622.

In an exemplary embodiment, fixed flared diffuser 642 may be mounted coaxial with and downstream of annular diffuser 640 similar to fixed flared diffuser 160 mounted coaxial with and downstream of annular diffuser 14. In an exemplary embodiment, fixed flared diffuser 642 may be in fluid communication with annular diffuser 640, i.e., an air stream passing through annular diffuser 640 may pass through fixed flared diffuser 642. In an exemplary embodiment, fixed flared diffuser 642 may be structurally similar to fixed flared diffuser 160, meaning that, fixed flared diffuser 642 may include an annular leading edge similar to annular leading edge 1600 that may be positioned in line with or slightly upstream of a trailing edge of annular diffuser 642 that may be similar to trailing edge 142 of annular diffuser 14. In an exemplary embodiment, the annular leading edge of fixed flared diffuser 642 may be coupled in fluid communication with the trailing edge of annular diffuser 640 similar to annular leading edge 1600 of fixed flared diffuser 160 coupled in fluid communication with trailing edge 142 of annular diffuser 14. In an exemplary embodiment, fixed flared diffuser 642 may further include first flared petals similar to first flared petals 1602*a-c* that may extend from the annular leading edge of fixed flared diffuser 642 toward an annular outlet end of wind turbine 62 that may be similar to annular outlet end 112 of diffuser-augmented wind turbine 10. In an exemplary embodiment, the first flared petals may flare out toward the annular outlet end of wind turbine 62.

In an exemplary embodiment, rotatable flared diffuser 644 may be mounted coaxial with and within fixed flared diffuser 642 similar to rotatable flared diffuser 162 mounted coaxial with and within fixed flared diffuser 160. In an exemplary embodiment, rotatable flared diffuser 644 may be rotatable with respect to fixed flared diffuser 642 similar to rotatable flared diffuser 162 rotatable relative to fixed flared diffuser 160 about main axis 122. In an exemplary embodiment, rotatable flared diffuser 644 may be in fluid communication with annular diffuser 640, i.e., an air stream passing through annular diffuser 640 may pass through rotatable flared diffuser 644. In an exemplary embodiment, rotatable flared diffuser 644 may be structurally similar to rotatable flared diffuser 162, meaning that, rotatable flared diffuser 644 may include an annular leading edge similar to annular leading edge 1620 that may be positioned coaxially within annular leading edge 1600 of fixed flared diffuser 160. In an exemplary embodiment, the annular leading edge of rotatable flared diffuser 644 may be coupled in fluid communication with the trailing edge of annular diffuser 640 similar to annular leading edge 1620 of rotatable flared diffuser 162 coupled in fluid communication with trailing edge 142 of annular diffuser 14. In an exemplary embodiment, rotatable flared diffuser 644 may further include second flared petals similar to second flared petals 1622*a-c* that may extend from the annular leading edge of rotatable flared diffuser 644 toward an annular outlet end of wind turbine 62 that may be similar to annular outlet end 112 of diffuser-augmented wind turbine 10. In an exemplary embodiment, the second flared petals may flare out toward the annular outlet end of wind turbine 62.

In an exemplary embodiment, rotatable flared diffuser 644 may be rotated relative to fixed flared diffuser 642 between a first rotational position and a second rotational position. In the first rotational position, the second flared petals of rotatable flared diffuser 644 may fill in the empty spaces between the first flared petals of fixed flared diffuser 642 similar to second flared petals 1622a-c filling in the empty spaces between first flared petals 1602a-c as illustrated in FIG. 1. In the second rotational position, the second flared petals of rotatable flared diffuser 644 may be positioned immediately below the second flared petals of fixed flare diffuser 642 similar to second flared petals 1622a-c positioned immediately below first flared petals 1602a-c as illustrated in FIG. 2C. In an exemplary embodiment, in the first rotational position, fixed flared diffuser 642 and rotatable flared diffuser 644 may form a truncated curved cone and in the second rotational position, rotatable flared diffuser 644 may be positioned below fixed flared diffuser 642 and together fixed flared diffuser 642 and rotatable flared diffuser 644 may form a truncated curved cone with open segments in the wall of the truncated curved cone. In an exemplary embodiment, outer surface area of variable geometry diffuser 64 that may be exposed to wind in the first rotational position is more than the surface area of variable geometry diffuser 64 exposed to wind in the second rotational position. Consequently, drag forces acting on variable geometry diffuser 64 in the second rotational position are less than the drag forces acting on variable geometry diffuser 64 in the first position for a given wind velocity. In exemplary embodiments, such rotation of rotatable flared diffuser 644 from the first rotational position to the second rotational position may allow for rotating rotatable flared diffuser 644 to the second position in high wind velocities to reduce the drag forces acting on variable geometry diffuser 64 and rotate rotatable flared diffuser 644 to the first position at lower wind velocities to compensate for the low mass flow rate of air passing through wind turbine 62.

In an exemplary embodiment, system 60 may further include a rotary actuator 66 that may be coupled with rotatable flared diffuser 644. Rotary actuator 66 may be configured to actuate a rotational movement of rotatable flared diffuser 644 between the first rotational position and the second rotational position. In an exemplary embodiment, rotary actuator 66 may be an electric motor coupled with rotatable flared diffuser 644.

In an exemplary embodiment, system 60 may further include a sensor system 610 that may include a position sensor 6102 and a wind velocity sensor 6104. In an exemplary embodiment, position sensor 6102 may be coupled to rotary actuator 66. Position sensor 6102 may be configured to sense and transmit a rotational position of rotary actuator 66 at every instant. In an exemplary embodiment, wind velocity sensor 6104 may be configured to measure and transmit wind velocity at every instant.

In an exemplary embodiment, system 60 may further include a controller 68 that may be coupled with rotary actuator 66 and sensor system 610. In an exemplary embodiment, controller 68 may be configured to receive a current rotational position of rotatable flared diffuser 644 from position sensor 6102 and a wind velocity data from wind velocity sensor 6104. In an exemplary embodiment, controller 68 may further be configured to calculate a new rotational position for rotatable flared diffuser 644 based on an established calibration relationship between wind velocity and rotational position of rotatable flared diffuser 644 and the received current rotational position and the wind velocity data. In an exemplary embodiment, controller 68 may further be configured to urge rotary actuator 66 to rotate rotatable flared diffuser 644 from a current position to a new position. In an exemplary embodiment, a calibration relationship between wind velocities and rotational position of rotatable flared diffuser 644 may be established by calculating drag forces acting on variable geometry diffuser 64 in a wind tunnel experimental setup and minimizing the drag forces acting on variable geometry diffuser 64 at different wind velocities by changing the rotational position of rotatable flared diffuser 644.

Figure 7:
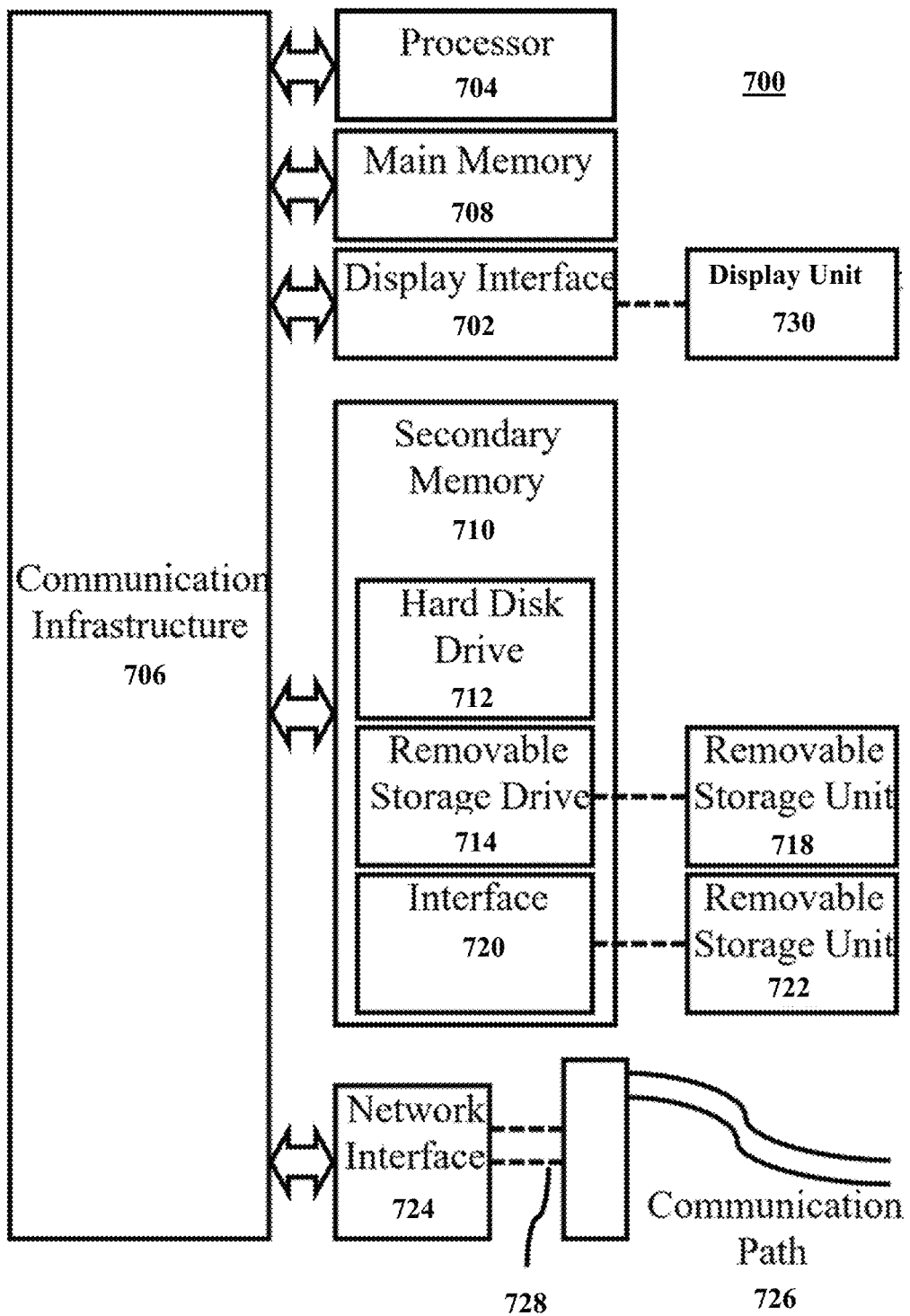
FIG. 7 illustrates a high-level functional block diagram of a computer system, consistent with exemplary embodiments of the present disclosure.

FIG. 7 illustrates a high-level functional block diagram of a computer system 700, in which an embodiment of the present invention, or portions thereof, may be implemented as computer-readable code, consistent with exemplary embodiments of the present disclosure. For example, controller 68 may be implemented as computer system 700 using hardware, software, firmware, tangible computer-readable media having instructions stored thereon, or a combination thereof and may be implemented in one or more computer systems or other processing systems.

If controller 68 is implemented as a programmable logic, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 700. After reading this description, it will become apparent to a person skilled in the relevant art how to implement the invention using other computer systems and/or computer architectures. Although operations may be described as a sequential process, some of the operations may be performed in parallel, concurrently, and/or in a distributed environment, and with program code stored locally or remotely for access by single or multi-processor machines. Also, in some embodiments, the order of operations may be rearranged without departing from the spirit of the disclosed subject matter.

Processor device 704 may be a special purpose or a general-purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 may be connected to a communication infrastructure 706, for example, a bus, message queue, network, or multi-core message-passing scheme.

In an exemplary embodiment, computer system 700 may include a display interface 702, for example, a video connector, to transfer data to a display unit 730, for example, a monitor. Computer system 700 may also include a main memory 708, for example, random access memory (RAM), and may also include a secondary memory 710. Secondary memory 710 may include, for example, a hard disk drive 712, and a removable storage drive 714. Removable storage drive 714 may include a floppy disk drive, a magnetic tape drive, an optical disk drive, a flash memory, or the like. Removable storage drive 714 may read from and/or write to a removable storage unit 718 in a well-known manner. Removable storage unit 718 may include a floppy disk, a magnetic tape, an optical disk, etc., which may be read by and written to by removable storage drive 714. As will be appreciated by persons skilled in the relevant art, removable storage unit 718 may include a computer-usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot, and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Computer program medium and computer-usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement different embodiments of the present disclosure as discussed herein. In particular, the computer programs, when executed, enable processor device 704 to implement the processes of the present disclosure, such as the operations of receiving data from sensor system 610, where the received data may include the wind velocity and the rotational position of rotatable flared diffuser 644, receiving a calibration relationship that relates the wind velocity with rotational position of rotatable flared diffuser 644 about the main axis, determining a second rotational position for rotatable flared diffuser 644 about the main axis based on the received data from sensor system 610 and the received calibration relationship, and urging rotary actuator 66 to drive a rotational movement of rotatable flared diffuser 644 form the first rotational position to the second rotational position. Accordingly, such computer programs represent controllers of computer system 700. Where an exemplary embodiment of such operations as discussed above is implemented using software, the software may be stored in a computer program product and loaded into computer system 700 using removable storage drive 714, interface 720, and hard disk drive 712, or communications interface 724.

Embodiments of the present disclosure also may be directed to computer program products including software stored on any computer useable medium. Such software, when executed in one or more data processing devices, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure and is not to be interpreted as reflecting an intention that the claimed implementations require more features than are expressly recited in each claim. Rather, as the following claims reflect, the inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A diffuser-augmented wind turbine, comprising:
   an annular diffuser comprising a first annular leading edge and a first annular trailing edge;
   a rotor disposed within the annular diffuser, the rotor comprising a hub and at least one rotor blade coupled to the hub, the rotor coaxial with the annular diffuser about a main axis, the rotor rotatable about the main axis on a rotor plane perpendicular to the main axis, the first annular leading edge configured to allow a first air stream to be provided to the rotor plane;
   a flared diffuser assembly comprising a second annular leading edge and a second annular trailing edge, the flared diffuser coaxially coupled to the annular diffuser about the main axis, the second leading edge in fluid communication with the first trailing edge, the second leading edge configured to allow the first air stream received from the first trailing edge to enter the flared diffuser assembly, the flared diffuser assembly further comprising:
      a fixed flared diffuser comprising a first plurality of flared petals extending from the second annular leading edge toward the second annular trailing edge, each flared petal of the first plurality of flared petals extended between a first leading edge and a first trailing edge, the first leading edge attached to the second annular leading edge, each flared petal of the first plurality of flared petals further comprising two first side edges, the first leading edge and the first trailing edge comprising arcs extended between the two first side edges;
      a rotatable flared diffuser comprising an annular leading edge disposed within and encompassed by the second annular leading edge, the rotatable flared diffuser comprising a second plurality of flared petals extending from the annular leading edge toward the second annular trailing edge, each flared petal of the second plurality of flared petals extended between a second leading edge and a second trailing edge, each flared petal of the second plurality of flared petals further comprising two second side edges, the second leading edge and the second trailing edge comprising arcs extended between the two second side edges;
      the rotatable flared diffuser coaxial with the fixed flared diffuser about the main axis, the rotatable flared diffuser rotatable about the main axis; and
   a nacelle, the hub rotatably coupled with the nacelle.

2. The diffuser-augmented wind turbine of claim 1, wherein the first plurality of flared petals comprises three equally spaced apart flared petals, each flared petal of the first plurality of flared petals comprising a one-sixth segment of a curved cone extending from the second annular leading edge flaring out towards the second annular trailing edge.

3. The diffuser-augmented wind turbine of claim 2, wherein the second plurality of flared petals comprises three equally spaced apart flared petals, each flared petal the second plurality of flared petals comprising a one-sixth segment of a curved cone extending from the annular leading edge flaring out towards the second trailing edge.

4. The diffuser-augmented wind turbine of claim 2, wherein the rotatable flared diffuser is rotatable between a first rotational position and a second rotational position about the main axis, the first rotational position corresponding to a position wherein each flared petal of the second plurality of flared petals is positioned between two corresponding flared petals of the first plurality of flared petals such that each of the two second side edges of each flared petal of the second plurality of flared petals is in line with a respective side edge of the two first side edges of each flared petals of the two corresponding flared petals.

5. The diffuser-augmented wind turbine of claim 4, wherein the second rotational position corresponding to a position wherein each flared petal of the second plurality of flared petals is positioned behind a corresponding flared petal of the first plurality of flared petals from a first perspective, such the two second side edges of each flared petal of the second plurality of flared petals are in line with respective two first side edges of the corresponding flared petal of the first plurality of flared petals.

6. The diffuser-augmented wind turbine of claim 1, further comprising an annular air gap between an outer surface of the first trailing edge and an inner surface of the second leading edge, the annular air gap configured to allow a second air stream to enter the flared diffuser assembly.

7. The diffuser-augmented wind turbine of claim 6, wherein the second leading edge is mounted upstream of the first trailing edge.

8. The diffuser-augmented wind turbine of claim 6, wherein the second leading edge is attached to the first trailing edge.

9. The diffuser-augmented wind turbine of claim 1, wherein the annular diffuser further comprises a converging section that extends from the first leading edge to the rotor plane, a straight section that encompasses the rotor blades, and a diverging section extending between the straight section and the first trailing edge.

10. The diffuser-augmented wind turbine of claim 1, wherein the fixed flared diffuser is attached to the nacelle via a first plurality of radially extended struts and wherein the rotatable flared diffuser is rotatably attached to the nacelle via a second plurality of radially extended struts.

11. The diffuser-augmented wind turbine of claim 1, further comprising a rotational actuator coupled with the rotatable flared diffuser, the rotational actuator configured to drive a rotational movement of the rotatable flared diffuser about the main axis.

12. The diffuser-augmented wind turbine of claim 11, further comprising a sensor system configured to measure the wind velocity entering the diffuser-augmented wind turbine, the sensor system further configured to determine a first rotational position of the rotatable flared diffuser about the main axis.

13. The diffuser-augmented wind turbine of claim 12, further comprising a control mechanism coupled with the rotational actuator and the sensor, the control mechanism configured to urge the rotational actuator to rotate the rotatable flared diffuser, the control mechanism comprising:
at least one processor; and
at least one memory coupled to the at least one processor, the at least one memory storing executable instructions to urge the at least one processor to:
receive data from the sensor system, the data comprising the wind velocity and the rotational position of the rotatable flared diffuser;
receive a calibration relationship that relates the wind velocity with rotational position of the rotatable flared diffuser about the main axis;
determine a second rotational position for the rotatable flared diffuser about the main axis based on the received data from the sensor system and the received calibration relationship; and
urge the rotational actuator to drive a rotational movement of the rotatable flared diffuser form the first rotational position to the second rotational position.

* * * * *